United States Patent
Liu et al.

(10) Patent No.: US 11,413,608 B2
(45) Date of Patent: Aug. 16, 2022

(54) METHOD FOR PREPARING BI-COMPONENT, MULTI-NETWORK NANOFIBROUS AEROGEL-SUPPORTED HETEROJUNCTION PHOTOCATALYST AND APPLICATION THEREOF

(71) Applicant: NANJING UNIVERSITY, Nanjing (CN)

(72) Inventors: Fuqiang Liu, Nanjing (CN); Jinli Qiu, Nanjing (CN); Pei Fan, Nanjing (CN); Cailiang Yue, Nanjing (CN); Ranran Yuan, Nanjing (CN); Aimin Li, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 445 days.

(21) Appl. No.: 16/748,720

(22) Filed: Jan. 21, 2020

(65) Prior Publication Data
US 2020/0238263 A1  Jul. 30, 2020

(30) Foreign Application Priority Data
Jan. 25, 2019 (CN) .......................... 201910072377.0

(51) Int. Cl.
*B01J 31/00* (2006.01)
*B01J 31/06* (2006.01)
(Continued)

(52) U.S. Cl.
CPC ............. *B01J 31/061* (2013.01); *B01J 31/06* (2013.01); *B01J 31/1625* (2013.01);
(Continued)

(58) Field of Classification Search
None
See application file for complete search history.

(56) References Cited

U.S. PATENT DOCUMENTS

2006/0264132 A1* 11/2006 Leeser .................. D06M 11/79
442/131

FOREIGN PATENT DOCUMENTS

CN 103285920 A * 9/2013
CN 104611779 B * 3/2017

OTHER PUBLICATIONS

CN-103285920-A, English translation (Year: 2013).*
CN-104611779-B, English translation (Year: 2017).*

* cited by examiner

*Primary Examiner* — Stefanie J Cohen
(74) *Attorney, Agent, or Firm* — Bayramoglu Law Offices LLC

(57) ABSTRACT

A method for preparing a bi-component, multi-network nanofibrous aerogel-supported heterojunction photocatalyst includes the following steps. Step 1, preparing ammoniated polyacrylonitrile nanofibers. Step 2, dispersing the ammoniated polyacrylonitrile nanofibers in water to obtain a first solution; dispersing cellulose nanofibers in water to obtain a second solution; and mixing, heating and lyophilizing the first solution with the second solution to obtain a bi-component, multi-network nanofibrous aerogel. Step 3, adding graphite carbon nitride, a ferric-iron containing reagent, 2,5-diaminoterephthalic acid, and the bi-component, multi-network nanofiber aerogel obtained in the step 2 into a N, N-dimethylformamide solvent to obtain a third solution, and carrying out a hydrothermal reaction on the third solution for 8-24 hours to obtain the bi-component, multi-network nanofibrous aerogel-supported heterojunction photocatalyst.

18 Claims, 5 Drawing Sheets

(51) Int. Cl.
  *B01J 31/16* (2006.01)
  *B01J 35/00* (2006.01)
  *B01J 35/06* (2006.01)
  *B01J 37/00* (2006.01)
  *B01J 37/03* (2006.01)
  *B01J 37/04* (2006.01)
  *B01J 37/10* (2006.01)
  *C02F 1/32* (2006.01)
  *C02F 1/72* (2006.01)

(52) U.S. Cl.
  CPC ......... *B01J 35/004* (2013.01); *B01J 35/0013* (2013.01); *B01J 35/06* (2013.01); *B01J 37/0009* (2013.01); *B01J 37/036* (2013.01); *B01J 37/04* (2013.01); *B01J 37/10* (2013.01); *C02F 1/32* (2013.01); *C02F 1/725* (2013.01); *C02F 2305/10* (2013.01)

US 11,413,608 B2

METHOD FOR PREPARING BI-COMPONENT, MULTI-NETWORK NANOFIBROUS AEROGEL-SUPPORTED HETEROJUNCTION PHOTOCATALYST AND APPLICATION THEREOF

CROSS REFERENCE TO THE RELATED APPLICATIONS

This application is based upon and claims priority to Chinese Patent Application No. 201910072377.0, filed on Jan. 25, 2019, the entire contents of which are incorporated herein by reference.

TECHNICAL FIELD

The present disclosure belongs to the field of preparation of nano-functional materials and application thereof, and more specifically relates to a method for preparing a bi-component, multi-network nanofibrous aerogel-supported heterojunction photocatalyst and an application thereof.

BACKGROUND

Pollution of environment, more particularly pollution of water is a serious problem that introduced as a result of new industrial developments in our society. The method of removing pollutants from water used to be separation of pollutant from water by use of adsorption, precipitation and extraction. These methods have been mostly replaced with methods that make pollutants harmless. Among them, photocatalysis, as an advanced oxidation technique, has gradually become a current research focus due to its advantages such as low energy consumption, no secondary pollution, and high efficiency. Photocatalyst, as the core of the process in photocatalytic technique, has great influence on photocatalytic efficiency. Currently, the commonly used photocatalysts are mainly nanoparticles and powders, which are easy to agglomerate, difficult to separate, and may easily cause secondary pollution. Moreover, single-component photocatalysts have the disadvantages of narrow light absorption range, low efficiency, fast recombination of electrons and holes, and others.

Therefore, it is necessary to develop a novel catalyst support, and solve the drawbacks of the existing photocatalysts by means of metal/non-metal doping and construction of heterojunctions. The commonly used catalyst supports include glass, ceramics, membranes, microspheres, and others. These supports all have certain drawbacks. For example, the glass support is thick and the surface is smooth, which is inconvenient in practical use; the ceramic support is relatively expensive; the morphology and pore size of the membrane support are difficult to control, and the operation cost is high; and the microsphere support needs to be recovered by the methods of adding magnetism or filtration, which is inconvenient to operate. Nanofibrous aerogel, as a lightweight, low-density material, is a good support for photocatalyst because of its unique network structure and pores. However, the general natural cellulose aerogels have problems, such as poor thermal stability and low mechanical strength, which limits their applications in supporting photocatalysts.

SUMMARY

The present disclosure aims to solve the above-mentioned technical problems in the prior art, and provides a method for preparing a bi-component, multi-network nanofibrous aerogel-supported heterojunction photocatalyst. After amination of polymer nanofibers, aerogels with multi-network structures are formed by hydrogen bonding with natural cellulose nanofibers; by means of hydrothermal growth, graphite carbon nitride forms a heterojunction with an iron-based metal-organic frame material; and then an aerogel photocatalyst for efficiently removing various pollutants in water is attained by compounding.

To solve the above-mentioned problems, the technical solution of the present invention is as follows.

A method for preparing a bi-component, multi-network nanofibrous aerogel-supported heterojunction photocatalyst includes the following steps:

step 1, preparing ammoniated polyacrylonitrile nanofibers;

step 2, dispersing the ammoniated polyacrylonitrile nanofibers in an aqueous solution to obtain solution A; dispersing cellulose nanofibers in an aqueous solution to obtain solution B; and mixing, heating and lyophilizing solution A with solution B to obtain a bi-component, multi-network nanofibrous aerogel; and step 3, adding graphite carbon nitride, a ferric-iron containing reagent, 2,5-diaminoterephthalic acid, and the bi-component, multi-network nanofiber aerogel obtained in step 2 into a N, N-dimethylformamide solvent, and carrying out a hydrothermal reaction for 8-24 hours to obtain a product.

Preferably, a method for preparing the ammoniated polymer nanofibers in step 1 is as follows:

step 1.1, preparing polyacrylonitrile nanofibers by using a polyacrylonitrile high polymer solution as a spinning solution and using high-voltage electrostatic spinning technique; and step 1.2, placing the polyacrylonitrile nanofibers in an aqueous solution containing an ammoniating agent, adjusting a temperature to 100-180° C., and carrying out a heating reaction for 6-24 hours.

Preferably, in the step 1.1, the mass fraction of the spinning solution is 8%-15%, the spinning voltage is 10-30 kV, the flow rate of the spinning solution is 0.5-2.0 mL/h, and the collection distance is 13-22 cm.

Preferably, in step 1.2, the dosage of the polyacrylonitrile nanofibers is 2-5 g/L, and the dosage of the ammoniating reagent is 100-500 g/L.

Preferably, in the step 1.2, the ammoniating reagent is any one selected from the group consisting of ethylenediamine, triethylenediamine, tetraethylenepentamine, a polyamine, and polyethyleneimine.

Preferably, in step 2, heating conditions are: placing in an oven for drying at 80° C. for 0.5-8 hours.

Preferably, in step 2, the mass-volume ratio of the ammoniated polyacrylonitrile nanofibers to water in solution A is 5-20 g/L, a volume ratio of the cellulose nanofiber solution having a mass fraction of 5% to water in solution B ranges from 1:5 to 1:20, and a mixed volume ratio of solution A and solution B is 1:1.

Preferably, in step 3, a method for preparing the graphite carbon nitride is: calcining melamine at 400-550° C. for 2-6 hours.

Preferably, in step 3, the ferric-iron containing reagent is selected from a group consisting of ferric nitrate, ferric chloride, and ferric sulfate.

Preferably, in step 3, a dosage of the graphite carbon nitride is 1-5 g/L, a dosage of the ferric-iron containing reagent is 2-10 g/L, and the mass ratio of the ferric-iron containing reagent to the 2,5-diaminoterephthalic acid ranges from 1:1 to 1:5, and the dosage of the nanofibrous aerogel is 0.5-2 g/L.

Preferably, in step 3, the temperature for the hydrothermal reaction is 120-180° C.

Preferably, in step 3, the post-treatment method of the obtained product is: washing the obtained product with ethanol and water, and drying in a vacuum drying oven at 60° C.

In the present invention, the thermal stability and mechanical properties of the aerogel support are improved by the hydrogen-bonding interaction between the hydroxyl group of the natural cellulose nanofibers, the amino of the polymer nanofibers, the multi-network structure cross-formed between the two components, and the structure and the morphology are controllable. The graphite carbon nitride and the iron-based metal-organic framework materials are compounded to form a heterojunction, thereby improving the separation efficiency of electrons and holes, and enhancing the photocatalytic effect. Meanwhile, the graphite carbon nitride and the iron-based metal-organic framework materials are loaded onto the bi-component, multi-network nanofibrous aerogel by hydrothermal growth. The bi-component, multi-network nanofibrous aerogel supported heterojunction photocatalyst can be used to efficiently remove various pollutants in water, and may also be used for hydrogen production and water sterilization.

Compared with the prior art, the advantages of the present invention are as follows.

1) Compared with the existing photocatalysts, the three-dimensional aerogel catalyst prepared by the present invention has significantly enhanced absorption performance in the visible region and has high electron-hole separation efficiency.

2) Compared with most of the powder catalysts, the newly prepared three-dimensional aerogel catalyst has solved the problem of nanoparticles and powder photocatalysts being easy to agglomerate and difficult to recover. Moreover, the newly prepared three-dimensional aerogel catalyst can be recycled and reused many times without secondary pollution.

3) The bi-component, multi-network nanofiber aerogel is used as a support to construct a multi-network structure, which solves the problems of poor thermal stability and low mechanical strength in the existing aerogel supports, thereby expanding its application range.

DETAILED DESCRIPTION OF THE EMBODIMENTS

Embodiment 1

Figure 1:
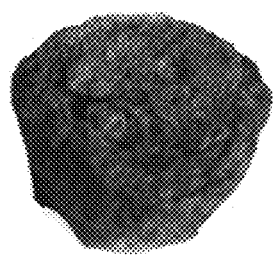
FIG. 1 is a physical view of a composite photocatalyst according to Embodiment 3 of the present invention.
Figure 2:
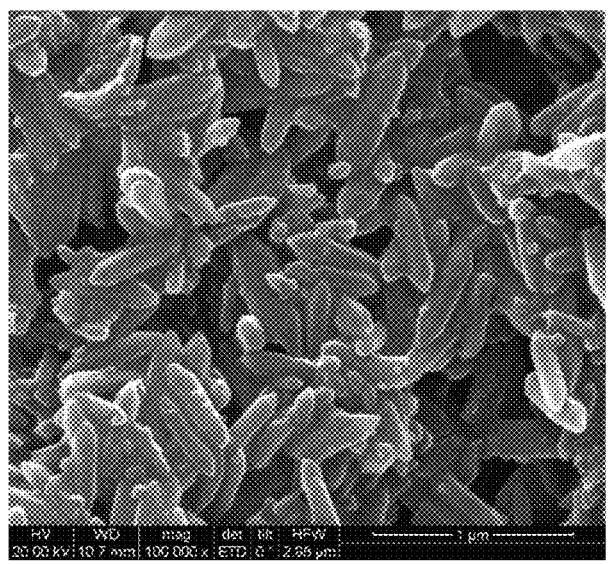
FIG. 2 is a scanning electron microscope (SEM) diagram of a composite photocatalyst according to Embodiment 3 of the present invention.
Figure 3:
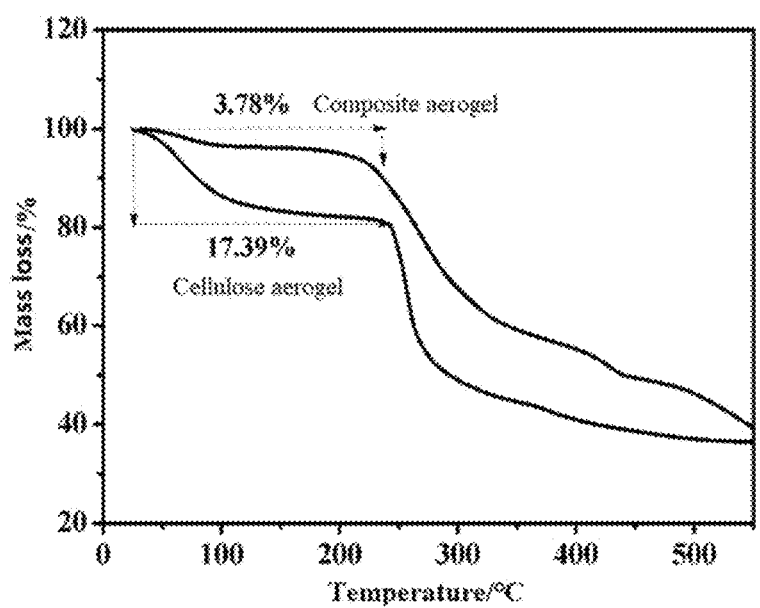
FIG. 3 is a diagram showing a comparison result of thermal stability of the bi-component, multi-network nanofibrous aerogel support and thermal stability of the cellulose nanofiber support prepared in Embodiment 3 of the present invention.
Figure 4:
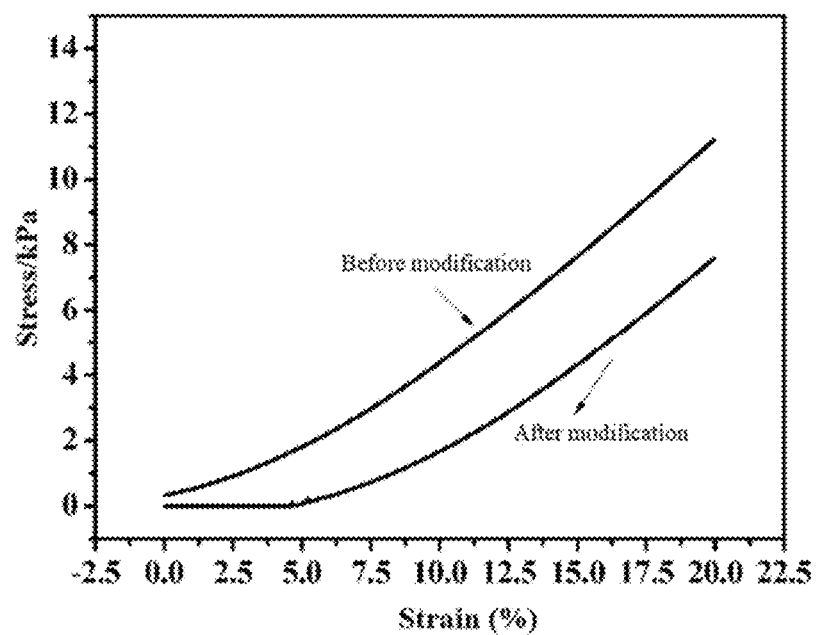
FIG. 4 is a diagram showing stress-strain curves of a catalyst before and after being modified with a bi-component, multi-network nanofibrous aerogel prepared in Embodiment 3 of the present invention.

A method for preparing a bi-component, multi-network nanofibrous aerogel-supported heterojunction photocatalyst. The preparation steps are as follows.

1) 8% polyacrylonitrile polymer solution is prepared, and fixed on an injection pump of a high-voltage electrostatic spinning machine, a negative electrode of the spinning machine is connected to a collection plate, a positive electrode is connected to a glass syringe, the voltage is adjusted to 10 kV, the distance between the positive electrode and the negative electrode is 13 cm, the flow rate is 0.5 mL/h, and nanofibers are prepared by a high-voltage electrostatic spinning technique.

2) 0.4 g of the nanofibers prepared in step 1) are weighed and placed in a 200 mL aqueous solution containing polyethyleneimine, wherein a dosage of the polyethyleneimine is 20 g, a temperature is adjusted to 100° C., and the heating reaction is carried out for 6 hours.

3) The ammoniated nanofibers in step 2) are taken out, washed with ethanol and water to remove the remaining polyethyleneimine, and placed in a vacuum drying oven for drying at 60° C. for 24 hours.

4) 0.05 g of the ammoniated nanofibers obtained in step 3) is weighed and added into a 10 mL aqueous solution, stirred and dispersed at high speed to obtain the solution A. 2 mL of cellulose nanofiber aqueous solution (the mass fraction of cellulose nanofibers is 5%) is weighed, diluted and dispersed in a 10 mL aqueous solution to obtain the solution B. The solution A and the solution B are mixed uniformly, and are then placed in an oven for drying at 80° C. for 0.5 hour, followed by transferring to a freeze dryer to be dried to obtain a bi-component, multi-network nanofibrous aerogel.

5) 2 g of melamine is weighed, placed in a muffle furnace, and calcined at 400° C. for 2 hours to obtain graphite carbon nitride powder.

6) 0.05 g of graphite carbon nitride, 0.1 g of ferric nitrate, 0.1 g of 2,5-diaminoterephthalic acid, and 25 mg of the bi-component, multi-network nanofiber aerogel are weighed and added into 50 mL of a N, N-dimethylformamide solvent, and placed in a reaction kettle. Subsequently, a hydrothermal reaction are carried out at 120° C. for 8 hours. The obtained composite photocatalyst are washed with ethanol and water and dried in the vacuum drying oven at 60° C.

Embodiment 2

A method for preparing a bi-component, multi-network nanofibrous aerogel-supported heterojunction photocatalyst. The preparation steps are as follows.

1) 15% polyacrylonitrile polymer solution is prepared, and fixed on an injection pump of a high-voltage electrostatic spinning machine, a negative electrode of the spinning machine is connected to a collection plate, a positive electrode is connected to a glass syringe, a voltage is adjusted to 30 kV, the distance between the positive electrode and the negative electrode is 22 cm, a flow rate is 2.0 mL/h, and nanofibers are prepared by a high-voltage electrostatic spinning technique.

2) 1.0 g of the nanofibers prepared in step 1) are weighed and placed in a 200 mL aqueous solution containing triethylene diamine, wherein a dosage of the triethylene diamine is 100 g, a temperature is adjusted to 180° C., and a heating reaction is carried out for 24 hours.

3) The ammoniated nanofibers in step 2) are taken out, washed with ethanol and water to remove the remaining triethylene diamine, and placed in a vacuum drying oven for drying at 60° C. for 24 hours.

4) 0.2 g of the ammoniated nanofibers obtained in step 3) is weighed and added into a 10 mL aqueous solution, stirred and dispersed at high speed to obtain solution A. 0.5 mL of cellulose nanofiber aqueous solution (the mass fraction of cellulose nanofibers is 5%) is weighed, diluted and dispersed in a 10 mL aqueous solution to obtain solution B. The solution A and solution B are mixed uniformly, and are then placed in an oven for drying at 80° C. for 8 hours, followed by transferring to a freeze dryer to be dried to obtain a bi-component, multi-network nanofibrous aerogel.

5) 2 g of melamine is weighed, placed in a muffle furnace, and calcined at 550° C. for 6 hours to obtain graphite carbon nitride powder.

6) 0.25 g of graphite carbon nitride, 0.5 g of ferric sulfate, 2.5 g of 2,5-diaminoterephthalic acid, and 100 mg of the bi-component, multi-network nanofiber aerogel are weighed and added into 50 mL of a N, N-dimethylformamide solvent, and placed in a reaction kettle. Subsequently, a hydrothermal reaction is carried out at 180° C. for 24 hours. The obtained composite photocatalyst are washed with ethanol and water, and dried in a vacuum drying oven at 60° C.

Embodiment 3

A method for preparing a bi-component, multi-network nanofibrous aerogel-supported heterojunction photocatalyst. The preparation steps are as follows.

1) 10% polyacrylonitrile polymer solution is prepared, and fixed on an injection pump of a high-voltage electrostatic spinning machine, a negative electrode of the spinning machine is connected to a collection plate, a positive electrode is connected to a glass syringe, a voltage is adjusted to 20 kV, a distance between the positive electrode and the negative electrode is 15 cm, a flow rate is 1.0 mL/h, and nanofibers are prepared by high-voltage electrostatic spinning technique.

2) 0.6 g of the nanofibers prepared in step 1) are weighed and placed in a 200 mL aqueous solution containing tetraethylenepentamine, wherein a dosage of the tetraethylenepentamine is 40 g, the temperature is adjusted to 150° C., and a heating reaction is carried out for 12 hours.

3) The ammoniated nanofibers in step 2) are taken out, washed with ethanol and water to remove the remaining tetraethylenepentamine, and placed in a vacuum drying oven for drying at 60° C. for 24 hours.

4) 0.1 g of the ammoniated nanofibers obtained in step 3) is weighed and added into a 10 mL aqueous solution, stirred and dispersed at high speed to obtain solution A. 1 mL of cellulose nanofiber aqueous solution (the mass fraction of cellulose nanofibers is 5%) is weighed, diluted and dispersed in a 10 mL aqueous solution to obtain solution B. The solution A and solution B are mixed uniformly, and are placed in an oven for drying at 80° C. for 4 hours, followed by transferring to a freeze dryer to be dried to obtain a bi-component, multi-network nanofibrous aerogel.

5) 2 g of melamine is weighed, placed in a muffle furnace, and calcined at 500° C. for 4 hours to obtain graphite carbon nitride powder.

6) 0.1 g of graphite carbon nitride, 0.3 g of ferric chloride, 0.6 g of 2,5-diaminoterephthalic acid, and 50 mg of the bi-component, multi-network nanofiber aerogel are weighed and added into 50 mL of a N, N-dimethylformamide solvent, and placed in a reaction kettle. Subsequently, a hydrothermal reaction is carried out at 150° C. for 12 hours. The obtained composite photocatalyst are washed with ethanol and water, and dried in a vacuum drying oven at 60° C.

Embodiment 4

A method for preparing a bi-component, multi-network nanofibrous aerogel-supported heterojunction photocatalyst. The preparation steps are as follows.

1) 15% polyacrylonitrile polymer solution is prepared, and fixed on an injection pump of a high-voltage electrostatic spinning machine, a negative electrode of the spinning machine is connected to a collection plate, a positive electrode is connected to a glass syringe, a voltage is adjusted to 30 kV, a distance between the positive electrode and the negative electrode is 22 cm, a flow rate is 2.0 mL/h, and nanofibers are prepared by a high-voltage electrostatic spinning technique.

2) 1.0 g of the nanofibers prepared in step 1) are weighed and placed in a 200 mL aqueous solution containing polyethyleneimine, wherein a dosage of the polyethyleneimine is 100 g, a temperature is adjusted to 180° C., and a heating reaction is carried out for 24 hours.

3) The ammoniated nanofibers in step 2) are taken out, washed with ethanol and water to remove the remaining polyethyleneimine, and placed in a vacuum drying oven for drying at 60° C. for 24 hours.

4) 0.2 g of the ammoniated nanofibers obtained in step 3) is weighed and added into a 10 mL aqueous solution, stirred and dispersed at high speed to obtain a solution A. 0.5 mL of cellulose nanofiber aqueous solution (the mass fraction of cellulose nanofibers is 5%) is weighed, diluted and dispersed in a 10 mL aqueous solution to obtain the solution B. The solution A and the solution B are mixed uniformly, and are then placed in an oven for drying at 80° C. for 8 hours, followed by transferring to a freeze dryer to be dried to obtain a bi-component, multi-network nanofibrous aerogel.

5) 2 g of melamine is weighed, placed in a muffle furnace, and calcined at 550° C. for 6 hours to obtain graphite carbon nitride powder.

6) 0.25 g of graphite carbon nitride, 0.5 g of ferric chloride, 2.5 g of 2,5-diaminoterephthalic acid, and 100 mg of the bi-component, multi-network nanofiber aerogel are weighed and added into 50 mL of a N, N-dimethylformamide solvent, and placed in a reaction kettle. Subsequently, a hydrothermal reaction are carried out at 180° C. for 24 hours. The obtained composite photocatalyst are washed with ethanol and water, and dried in a vacuum drying oven at 60° C.

Embodiment 5

A method for preparing a bi-component, multi-network nanofibrous aerogel-supported heterojunction photocatalyst. The preparation steps are as follows.

1) 10% polyacrylonitrile polymer solution is prepared, and fixed on an injection pump of a high-voltage electrostatic spinning machine, a negative electrode of the spinning machine is connected to the collection plate, a positive electrode is connected to a glass syringe, a voltage is adjusted to 20 kV, a distance between the positive electrode and the negative electrode is 15 cm, a flow rate is 1.0 mL/h, and nanofibers are prepared by a high-voltage electrostatic spinning technique.

2) 0.6 g of the nanofibers prepared in step 1) are weighed and placed in a 200 mL aqueous solution containing ethylenediamine, wherein a dosage of the ethylenediamine is 40 g, a temperature is adjusted to 150° C., and a heating reaction is carried out for 12 hours.

3) The ammoniated nanofibers in step 2) are taken out, washed with ethanol and water to remove the remaining ethylenediamine, and placed in a vacuum drying oven for drying at 60° C. for 24 hours.

4) 0.1 g of the ammoniated nanofibers obtained in step 3) is weighed and added into a 10 mL aqueous solution, stirred and dispersed at high speed to obtain a solution A. 1 mL of cellulose nanofiber aqueous solution (the mass fraction of cellulose nanofibers is 5%) is weighed, diluted and dispersed in a 10 mL aqueous solution to obtain a solution B. The solution A and the solution B are mixed uniformly, and are then placed in an oven for drying at 80° C. for 4 hours, followed by transferring to a freeze dryer to be dried to obtain a bi-component, multi-network nanofibrous aerogel.

5) 2 g of melamine is weighed, placed in a muffle furnace, and calcined at 500° C. for 4 hours to obtain graphite carbon nitride powder.

6) 0.1 g of graphite carbon nitride, 0.3 g of ferric chloride, 0.6 g of 2,5-diaminoterephthalic acid, and 50 mg of the bi-component, multi-network nanofiber aerogel are weighed and added into 50 mL of a N, N-dimethylformamide solvent, and placed in a reaction kettle. Subsequently, a hydrothermal reaction are carried out at 150° C. for 12 hours. The obtained composite photocatalyst are washed with ethanol and water, and dried in a vacuum drying oven at 60° C.

Embodiment 6

A method for preparing a bi-component, multi-network nanofibrous aerogel-supported heterojunction photocatalyst. The preparation steps are as follows.

1) 8% polyacrylonitrile polymer solution is prepared, and fixed on an injection pump of a high-voltage electrostatic spinning machine, a negative electrode of the spinning machine is connected to a collection the plate, a positive electrode is connected to a glass syringe, a voltage is adjusted to 10 kV, a distance between the positive electrode and the negative electrode is 13 cm, a flow rate is 0.5 mL/h, and nanofibers are prepared by a high-voltage electrostatic spinning technique.

2) 0.4 g of the nanofibers prepared in step 1) are weighed and placed in a 200 mL aqueous solution containing tetraethylenepentamine, wherein a dosage of the tetraethylenepentamine is 20 g, a temperature is adjusted to 100° C., and a heating reaction is carried out for 6 hours.

3) The ammoniated nanofibers in step 2) are taken out, washed with ethanol and water to remove the remaining tetraethylenepentamine, and placed in a vacuum drying oven for drying at 60° C. for 24 hours.

4) 0.05 g of the ammoniated nanofibers obtained in step 3) is weighed and added into a 10 mL aqueous solution, stirred and dispersed at high speed to obtain a solution A. 2 mL of cellulose nanofiber aqueous solution (the mass fraction of cellulose nanofibers is 5%) is weighed, diluted and dispersed in a 10 mL aqueous solution to obtain a solution B. The solution A and the solution B are mixed uniformly, and are then placed in an oven for drying at 80° C. for 0.5 hours, followed by transferring to a freeze dryer to be dried to obtain a bi-component, multi-network nanofibrous aerogel.

5) 2 g of melamine is weighed, placed in a muffle furnace, and calcined at 400° C. for 2 hours to obtain graphite carbon nitride powder.

6) 0.05 g of graphite carbon nitride, 0.1 g of ferric nitrate, 0.1 g of 2,5-diaminoterephthalic acid, and 25 mg of the bi-component, multi-network nanofiber aerogel are weighed and added into 50 mL of a N, N-dimethylformamide solvent, and placed in a reaction kettle. Subsequently, a hydrothermal reaction are carried out at 120° C. for 8 hours. The obtained composite photocatalyst are washed with ethanol and water, and dried in a vacuum drying oven at 60° C.

Verification Experiment 1

Figure 5:
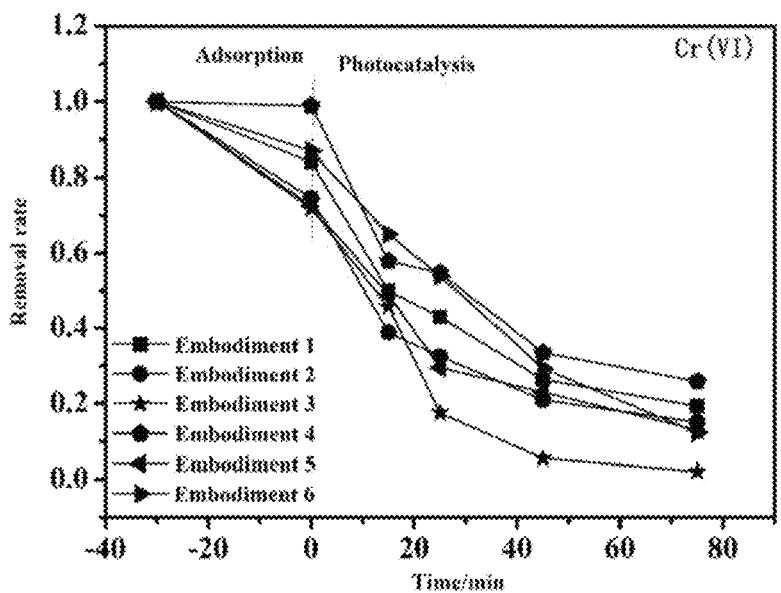
FIG. 5 is a diagram showing a reduction effect of composite photocatalysts prepared in Embodiments 1-6 of the present invention on hexavalent chromium.

25 mg of each of the photocatalysts prepared in Embodiments 1-6 is separately placed in a 50 mL hexavalent chromium solution with a concentration of 10 mg/L, and pre-adsorbed for half an hour under dark conditions. A 500 W xenon lamp is turned on for illumination, and sampling is carried out at regular intervals. Then, the absorbances are measured with an ultraviolet spectrophotometer at a wavelength of 540 nm. The reduction curves are shown in FIG. 5, from which it can be seen that the composite photocatalysts prepared by the present invention has the characteristic of rapid and efficient reduction on hexavalent chromium. Among them, the composite photocatalyst prepared in Embodiment 3 has the best reduction effect on hexavalent chromium. Therefore, the composite photocatalyst prepared by the preparation method of Embodiment 3 is selected for verification experiments 2-6.

Verification Experiment 2

Figure 6:
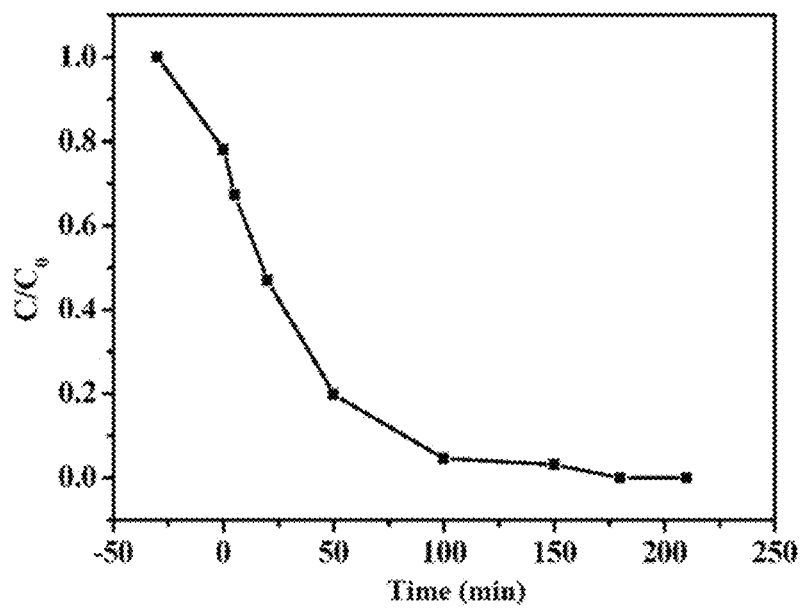
FIG. 6 is a diagram showing a degradation effect of the composite photocatalyst prepared in Embodiment 3 of the present invention on sulfamethoxazole.

25 mg of the photocatalyst prepared in Embodiment 3 is placed in a 50 mL sulfamethoxazole solution with a concentration of 20 mg/L, and pre-adsorbed for half an hour under dark conditions. The 500 W xenon lamp is turned on for illumination. Then, sampling is carried out at regular intervals, and the concentration is measured by liquid chromatography. The oxidation curve is shown in FIG. 6, from which it can be seen that the composite photocatalyst prepared by the present invention has the characteristics of rapid and efficient degradation on sulfamethoxazole.

Verification Experiment 3

Figure 7:
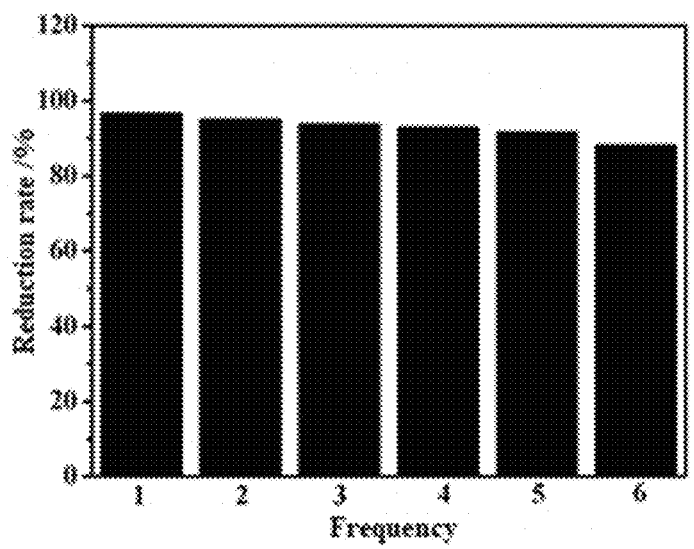
FIG. 7 is a diagram showing a recycling effect of the composite photocatalyst prepared in Embodiment 3 of the present invention on reduction of hexavalent chromium.

25 mg of the photocatalyst prepared in Embodiment 3 is placed in a 50 mL hexavalent chromium solution with a concentration of 10 mg/L, and pre-adsorbed for half an hour under dark conditions. The 500 W xenon lamp is turned on for illumination for one hour. Then, sampling is carried out, the absorbance is measured at a wavelength length of 540 nm, and the residual concentration of hexavalent chromium is calculated. After the first use, the composite photocatalyst is taken out and dried for a cyclic reuse experiment. The experimental conditions are the same as the first time, and the results are shown in FIG. 7. It can be seen from the figure that the composite photocatalyst prepared by the present invention can be used to reduce hexavalent chromium repeatedly without significantly reducing the reduction effect.

Verification Experiment 4

Figure 8:
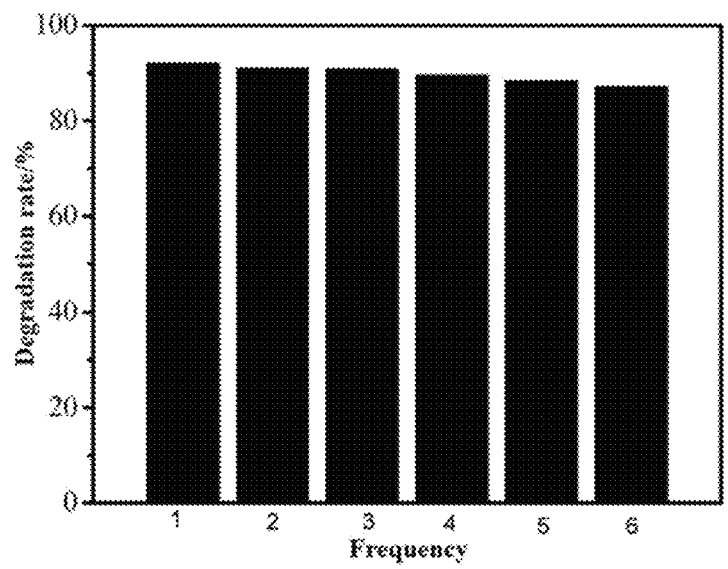
FIG. 8 is a diagram showing a recycling effect of the composite photocatalyst prepared in Embodiment 3 of the present invention on degradation of sulfamethoxazole.

25 mg of the photocatalyst prepared in Embodiment 3 is placed in a 50 mL sulfamethoxazole solution with a concentration of 20 mg/L, and pre-adsorbed for half an hour under dark conditions. The 500 W xenon lamp is turned on for illumination for one hour. Subsequently, sampling is carried out, and determination is carried out by liquid chromatography, and then the residual concentration of sulfamethoxazole is calculated. After the first use, the composite photocatalyst is taken out and dried for a cyclic reuse experiment. The experimental conditions are the same as the first time, and the results are shown in FIG. 8. It can be seen from the figure that the composite photocatalyst prepared by the present invention can be used to degrade sulfamethoxazole repeatedly without significantly reducing the degradation effect.

Verification Experiment 5

Figure 9:
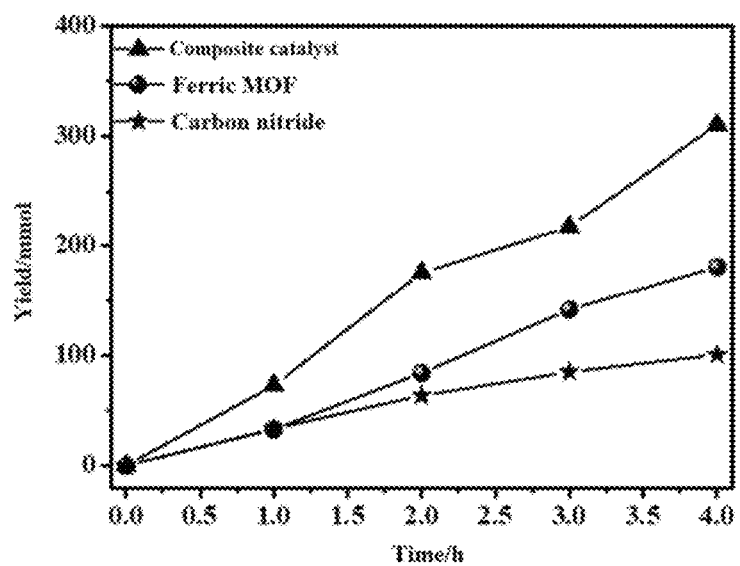
FIG. 9 is a diagram showing a comparison result of hydrogen production effect of the composite photocatalyst, the graphite carbon nitride, and the iron-based metal-organic frame material prepared in Embodiment 3 of the present invention.

0.1 g of each of the composite photocatalyst prepared in Embodiment 3, the single-component iron-based metal organic framework material and the graphite carbon nitride is weighed separately and placed in 240 mL of aqueous solution, followed by adding 30 mL of triethanolamine. After ultrasonic mixing, 3 wt % Pt was added. Then, the 500 W xenon lamp is turned on for illumination. The concentration of the generated hydrogen is monitored online by gas chromatography every 1 hour. The results are shown in FIG. 9, indicating that the hydrogen yield of the composite photocatalyst prepared by the present invention is higher than that of the single-component photocatalyst.

Verification Experiment 6

Figure 10:
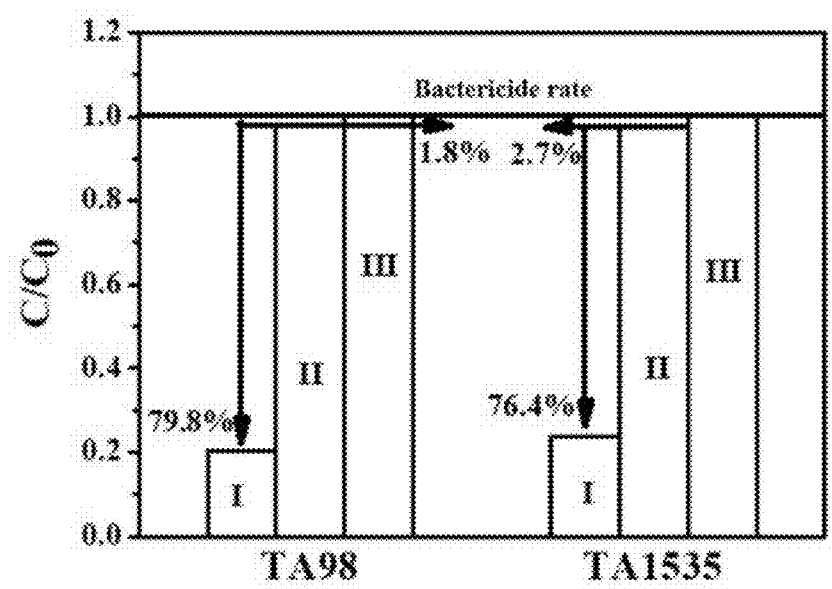
FIG. 10 is a diagram showing a bactericidal effect of the composite photocatalyst prepared in Embodiment 3 of the present invention.

Three copies of 50 mL of a bacterium solution of *Salmonella typhimurium* TA1535 in equal concentration are weighed separately. The first copy is added with 25 mg of the composite photocatalyst prepared in Embodiment 3 and is illuminated with a 500 W xenon lamp for 2 hours, numbered I. The second copy, without the photocatalyst, is illuminated with the 500 W xenon lamp for 2 hours, numbered II. The third copy, without the photocatalyst, is placed in the dark for 2 hours, numbered III. The operation process of *S. typhimurium* TA98 is the same as that of *S. typhimurium* TA1535. The results are shown in FIG. 10. It can be seen from the figure that the composite photocatalyst prepared by the present invention has obvious bactericidal effect on *Salmonella typhimurium*.

Combined with Embodiments 1-6 and verification experiments 1-6, the composite photocatalyst prepared by the preparation method provided by the present invention can be used for the rapid and efficient removal of various environmental pollutants in water with strong stability, and can be reused for many times. In addition, the composite photocatalyst also has the functions of hydrogen production and sterilization effects. The preparation method provided by the present invention is simple and easy to implement with low energy consumption, showing a broad application prospect in the degradation of pollutants in water.

It should be noted that the above-mentioned embodiments are merely preferred embodiments of the present invention, and are not used to limit the protective scope of the present invention. Equivalent replacements or substitutions made on the basis of the above concepts shall belong to the protective scope of the present invention.

What is claimed is:

1. A method for preparing a bi-component, multi-network nanofibrous aerogel-supported heterojunction photocatalyst, comprising the following steps:
    step 1, preparing ammoniated polyacrylonitrile nanofibers;
    step 2, dispersing the ammoniated polyacrylonitrile nanofibers in water to obtain a first solution; dispersing cellulose nanofibers in water to obtain a second solution; and mixing, heating and lyophilizing the first solution with the second solution to obtain a bi-component, multi-network nanofibrous aerogel; and
    step 3, adding graphite carbon nitride, a ferric-iron containing reagent, 2,5-diaminoterephthalic acid, and the bi-component, multi-network nanofiber aerogel obtained in the step 2 into a N, N-dimethylformamide solvent to obtain a third solution, and carrying out a hydrothermal reaction on the third solution for 8-24 hours to obtain the bi-component, multi-network nanofibrous aerogel-supported heterojunction photocatalyst.

2. The method according to claim 1, wherein, the step of preparing the ammoniated polymer nanofibers in the step 1 comprises:
    step 1.1, preparing polyacrylonitrile nanofibers with a polyacrylonitrile high polymer solution as a spinning solution by a high-voltage electrostatic spinning technique;
    step 1.2, placing the polyacrylonitrile nanofibers in an aqueous solution containing an ammoniating agent, adjusting a temperature to 100-180° C., and carrying out a heating reaction for 6-24 hours.

3. The method according to claim 2, wherein,
    in the step 1.1, a mass fraction of the spinning solution is 8%-15%, a spinning voltage is 10-30 kV, a flow rate of the spinning solution is 0.5-2.0 mL/h, and a collection distance is 13-22 cm;
    in the step 1.2, a dosage of the polyacrylonitrile nanofibers is 2-5 g/L, and a dosage of the ammoniating reagent is 100-500 g/L; and
    the ammoniating reagent is one selected from the group consisting of ethylenediamine, triethylenediamine, tetraethylenepentamine, a polyamine, and polyethyleneimine.

4. The method according to claim 1, wherein, in the step 2, the heating is performed in an oven at 80° C. for 0.5-8 hours.

5. The method according to claim 1, wherein, in the step 2, a mass-volume ratio of the ammoniated polyacrylonitrile nanofibers to water in the first solution is 5-20 g/L, a volume ratio of the cellulose nanofibers having a mass fraction of 5% to water in the second solution ranges from 1:5 to 1:20, and a volume ratio of the first solution and the second solution is 1:1.

6. The method according to claim 1, wherein, in the step 3, the graphite carbon nitride is prepared by calcining melamine at 400-550° C. for 2-6 hours.

7. The method according to claim 1, wherein, in the step 3, the ferric-iron containing reagent is one selected from the group consisting of ferric nitrate, ferric chloride, and ferric sulfate.

8. The method according to claim 1, wherein, in the step 3, a dosage of the graphite carbon nitride is 1-5 g/L, a dosage of the ferric-iron containing reagent is 2-10 g/L, and a mass ratio of the ferric-iron containing reagent to the 2,5-diaminoterephthalic acid ranges from 1:1 to 1:5, and a dosage of the bi-component, multi-network nanofibrous aerogel is 0.5-2 g/L.

9. The method according to claim 1, wherein, in the step 3, a temperature for the hydrothermal reaction is 120-180° C.

10. A method of using the bi-component, multi-network nanofiber aerogel-supported heterojunction photocatalyst made by the method according to claim 1, comprising: using the bi-component, multi-network nanofiber aerogel-supported heterojunction photocatalyst in environmental pollution treatment and energy conversion.

11. The method of claim 10, wherein, the step of preparing the ammoniated polymer nanofibers in the step 1 comprises:
step 1.1, preparing polyacrylonitrile nanofibers with a polyacrylonitrile high polymer solution as a spinning solution by a high-voltage electrostatic spinning technique;
step 1.2, placing the polyacrylonitrile nanofibers in an aqueous solution containing an ammoniating agent, adjusting a temperature to 100-180° C., and carrying out a heating reaction for 6-24 hours.

12. The method of claim 11, wherein,
in the step 1.1, a mass fraction of the spinning solution is 8%-15%, a spinning voltage is 10-30 kV, a flow rate of the spinning solution is 0.5-2.0 mL/h, and a collection distance is 13-22 cm;
in the step 1.2, a dosage of the polyacrylonitrile nanofibers is 2-5 g/L, and a dosage of the ammoniating reagent is 100-500 g/L; and
the ammoniating reagent is one selected from a group consisting of ethylenediamine, triethylenediamine, tetraethylenepentamine, a polyamine, and polyethyleneimine.

13. The method of claim 10, wherein, in the step 2, heating conditions are: placing in an oven for drying at 80° C. for 0.5-8 hours.

14. The method of claim 10, wherein, in the step 2, a mass-volume ratio of the ammoniated polyacrylonitrile nanofibers to water in the first solution is 5-20 g/L, a volume ratio of a cellulose nanofiber solution having a mass fraction of 5% to water in the second solution ranges from 1:5 to 1:20, and a mixed volume ratio of the first solution and the second solution is 1:1.

15. The method of claim 10, wherein, in the step 3, the graphite carbon nitride is prepared by the following step: calcining melamine at 400-550° C. for 2-6 hours.

16. The method of claim 10, wherein, in the step 3, the ferric-iron containing reagent is one selected from the group consisting of ferric nitrate, ferric chloride, and ferric sulfate.

17. The method of claim 10, wherein, in the step 3, a dosage of the graphite carbon nitride is 1-5 g/L, a dosage of the ferric-iron containing reagent is 2-10 g/L, and a mass ratio of the ferric-iron containing reagent to the 2,5-diaminoterephthalic acid ranges from 1:1 to 1:5, and a dosage of the bi-component, multi-network nanofibrous aerogel is 0.5-2 g/L.

18. The method of claim 10, wherein, in the step 3, a temperature for the hydrothermal reaction is 120-180° C.

* * * * *